United States Patent
Slight

(10) Patent No.: US 10,946,910 B2
(45) Date of Patent: Mar. 16, 2021

(54) DOWNFORCE DUCT

(71) Applicant: McLaren Automotive Limited, Surrey (GB)

(72) Inventor: Arthur Danny Slight, Surrey (GB)

(73) Assignee: McLaren Automotive Limited, Surrey (GB)

( * ) Notice: Subject to any disclaimer, the term of this patent is extended or adjusted under 35 U.S.C. 154(b) by 0 days.

(21) Appl. No.: 16/213,813

(22) Filed: Dec. 7, 2018

(65) Prior Publication Data

US 2019/0176908 A1 Jun. 13, 2019

(30) Foreign Application Priority Data

Dec. 8, 2017 (GB) ...................................... 1720536

(51) Int. Cl.
*B62D 35/02* (2006.01)
*B62D 35/00* (2006.01)
*B60K 11/00* (2006.01)

(52) U.S. Cl.
CPC ............. *B62D 35/02* (2013.01); *B62D 35/00* (2013.01); *B62D 35/005* (2013.01); *B60K 11/00* (2013.01)

(58) Field of Classification Search
CPC ...... B62D 35/00; B62D 35/02; B62D 35/005; B60K 11/00; B60K 11/08; B60K 11/085
USPC .................. 296/180.1–180.5; 180/68.1, 68.2
See application file for complete search history.

(56) References Cited

U.S. PATENT DOCUMENTS

| 2011/0316625 | A1 | 12/2011 | Scheytt |
| 2012/0292122 | A1* | 11/2012 | Verbrugge ............. B62D 25/12 180/68.4 |
| 2015/0321547 | A1 | 11/2015 | Pickl |
| 2016/0272257 | A1* | 9/2016 | McKillen ............. B62D 35/005 |

FOREIGN PATENT DOCUMENTS

| DE | 10 2008 054 772 B3 | 4/2010 |
| DE | 102015005022 B3 | 9/2016 |
| EP | 0982168 A1 | 3/2000 |
| EP | 2 942 220 A1 | 11/2015 |
| EP | 3 187 355 A1 | 7/2017 |
| RU | 2651951 C1 | 4/2018 |
| WO | WO 2017/037251 A1 | 3/2017 |

OTHER PUBLICATIONS

UK Search Report for corresponding GB Appl No. 1720536.0 dated May 30, 2018.
EP Search Report for corresponding Appl No. 18211150.0 dated Jul. 15, 2019.

* cited by examiner

*Primary Examiner* — Dennis H Pedder
(74) *Attorney, Agent, or Firm* — Fish & Richardson P.C.

(57) ABSTRACT

A vehicle having an underside, the vehicle comprising a first duct configured to channel air from a first outlet at the underside of the vehicle to a second outlet away from the underside of the vehicle so that when the vehicle is in forward motion the underside of the vehicle in front of the first outlet is at a lower pressure than the underside of the vehicle behind the first outlet.

20 Claims, 2 Drawing Sheets

DOWNFORCE DUCT

CROSS-REFERENCE TO RELATED APPLICATION

This application claims priority under 35 U.S.C. § 119 to Great Britain (GB) Application No. 1720536.0, filed Dec. 8, 2017. The contents of both of these applications are hereby incorporated by reference in its entirety.

This invention relates to a vehicle comprising a duct configured to channel air from a first outlet at the underside of the vehicle.

The downforce generated by a vehicle can have a substantial effect on the cornering and braking capability of the vehicle. The downforce can be generated by having lower pressure air underneath the vehicle relative to the pressure of air around the vehicle. This can be achieved by a front splitter that attempts to cause a high pressure area over the top of the splitter and a low pressure area under the splitter. The high pressure area is created by the air above the splitter being brought to stagnation, for example by an air dam. The low pressure area is created by the air under the splitter being accelerated due to its the proximity to the ground which thus reduces the pressure of this air.

In vehicles that are used exclusively in track or race situations, the distance between the underside of the vehicle and the running surface of the vehicle can be set to give the optimum desired downforce for the vehicle. However, this can be impractical in vehicles that are to also be used in a more normal environment, for example of the public roads. In this more normal environment, the distance between the underside of the vehicle and running surface may need to be increased from an optimum distance for downforce purposes to avoid grounding the underside of the vehicle. Also, the front portion of the nose of the vehicle extends in front of the front wheels of the vehicle. This puts a limit on the height of obstacles (for instance speed bumps) that can be cleared by the nose without grounding the nose of the vehicle. Therefore, the ride height of the vehicle may need to be increased from what would be optimal for downforce generation purposes to be practical in normal use. The underside surface of the nose of the vehicle may also be raised relative to the running surface to increase the size of obstacles that can be driven over without grounding the nose. These changes can have a negative effect on the downforce generated by the vehicle and thus the handling characteristics of the vehicle. For instance, if the ride height is increased the effect of the ground on the air running under the car may not be as great thus affecting the pressure of air under the vehicle.

It would therefore be desirable for a way of improving the downforce generated by a vehicle.

According to a first aspect of the present invention there is provided a vehicle having an underside, the vehicle comprising a first duct configured to channel air from a first outlet at the underside of the vehicle to a second outlet away from the underside of the vehicle so that when the vehicle is in forward motion the underside of the vehicle in front of the first outlet is at a lower pressure than the underside of the vehicle behind the first outlet.

The vehicle may comprise a passenger compartment and a nose region forward of the passenger compartment, wherein the first outlet may be located at the underside of the vehicle in the nose region. The vehicle may comprise a front splitter, wherein the first outlet may be located behind the front splitter. The front splitter may comprise a raised front end. When the vehicle is in forward motion, the raised front end of the front splitter may cause an increase in air pressure as air moves rearwardly under the front splitter.

The vehicle may comprise a passenger compartment and a nose region forward of the passenger compartment, wherein the second outlet may be located in the nose region. The vehicle may comprise a windscreen, wherein the second outlet may be located in a portion of the nose region where the windscreen meets the nose region. The vehicle may comprise a windscreen scuttle where the windscreen meets the nose region, wherein the second outlet may be located in the windscreen scuttle. The second outlet may be located at an outer side of where the windscreen meets the nose region.

The first outlet may be directed in a forward direction so that when the vehicle is in forward motion air is channelled into the first duct by the first outlet from underneath the vehicle. The first outlet may have a cross-sectional area that is greater than the cross-sectional area of the portion of the first duct adjacent to the first outlet.

The vehicle may comprise a passenger compartment and a nose region forward of the passenger compartment, wherein the first duct may be located in the nose region. The vehicle may comprise a heat exchanger and a cooling duct configured to channel air through the heat exchanger, the heat exchanger and cooling duct may be located in the nose region. The first duct may be adjacent to the cooling duct. The first duct may be positioned between the cooling duct and the passenger compartment.

The duct may comprise a restriction movable from a first position in which airflow through the duct is substantially unimpeded to a second position in which airflow through the duct is substantially impeded. The restriction may comprise a flap. The restriction may comprise a valve. The vehicle may comprise a second duct configured to channel air from a third outlet at the underside of the vehicle to a fourth outlet away from the underside of the vehicle so that when the vehicle is in forward motion the underside of the vehicle in front of the third outlet is at a lower pressure than the underside of the vehicle behind the third outlet. The first and second ducts may be positioned either side of a centreline of the vehicle. The first outlet and second outlet may be positioned to one side of the centreline of the vehicle, and the third outlet and fourth outlet may be positioned to the other side of the centreline of the vehicle.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle having an underside, the vehicle comprising a first duct configured to channel air from a first outlet at the underside of the vehicle to a second outlet away from the underside of the vehicle so that when the vehicle is in forward motion the underside of the vehicle in front of the first outlet is at a lower pressure than the underside of the vehicle behind the first outlet. The channel of air from the first outlet at the underside of the vehicle means that when the vehicle is in forward motion the underside of the vehicle in front of the first outlet is at a lower pressure than if the duct was not present. The vehicle is supported on a running surface. The vehicle may be configured so that the underside of the vehicle is in sufficient proximity to the running surface so that the flow of air under the vehicle generates downforce on the vehicle. The nose region of the vehicle may be configured so that the underside of the nose region of the vehicle is in sufficient proximity to the running surface so that the flow of air under the nose region of the vehicle generates downforce on the nose region of the vehicle. The vehicle may be configured so that the underside of the vehicle is in sufficient proximity to the running surface so that a flow of air entering the region between the underside of the vehicle and the running surface is accelerated in the region between the underside of the vehicle and the running surface to generate downforce on the vehicle. The nose region of the vehicle may be configured so that the underside of the nose region of the vehicle is in sufficient proximity to the running surface so that a flow of air entering the region between the underside of the nose region of the vehicle and the running surface is accelerated in the region between the underside of the nose region of the vehicle and the running surface to generate downforce on the vehicle. The nose of the vehicle may make use of ground effect on the air running between the underside of the nose and the running surface. Thus, the vehicle may be a ground effect road vehicle. This is in contrast to vehicles that have a distance between the underside and the running surface which means the flow of air in that region does not substantially generate downforce on the vehicle.

Figure 1:
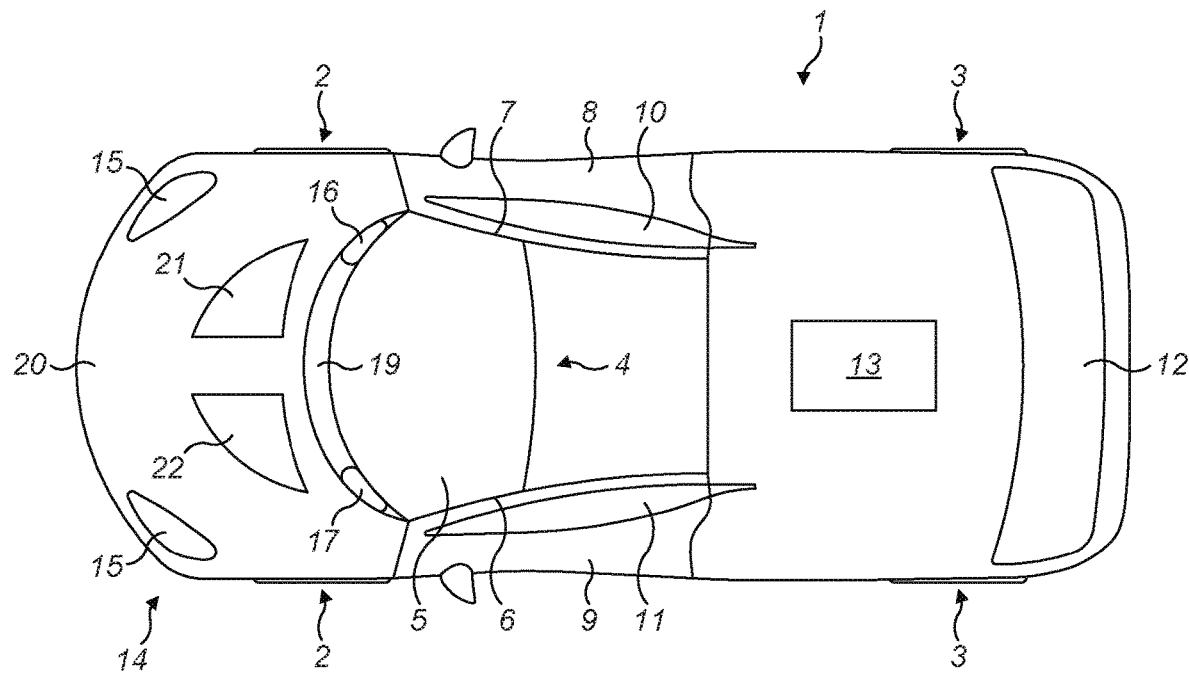
FIG. 1 shows a schematic drawing of a vehicle.

FIG. 1 shows a vehicle 1. The vehicle may be a car. The vehicle 1 comprises front wheels 2 and rear wheels 3. The front of the vehicle 1 is defined with reference to the primary motion direction of the vehicle. The front of the vehicle 1 points in the primary motion direction of the vehicle. Generally, a vehicle has a primary motion direction that is the forward direction. The vehicle 1 comprises a passenger compartment 4. The passenger compartment 4 may comprise one or more seats for occupants of the vehicle to sit in. The passenger compartment 4 may accommodate a driver. The passenger compartment 4 may accommodate one or more passengers. The vehicle may comprise controls located within the passenger compartment to enable an occupant to control the motion of the vehicle.

The vehicle comprises a windscreen 5. The windscreen 5 is generally orientated in a lateral direction across the width of the vehicle. The windscreen 5 does not necessarily extend across the whole width of the vehicle as shown in FIG. 1. The windscreen 5 permits occupants of the vehicle 1 located in the passenger compartment to see out of the vehicle in the primary motion direction of the vehicle 1. The windscreen is supported at its outer lateral edges by vehicle pillars 6, 7. These pillars may be known as A-pillars. Vehicle pillars 6, 7 may also delimit a portion of the aperture that is closed by doors 8, 9. The vehicle 1 in FIG. 1 comprises two doors 8, 9 although it will be appreciated that more doors may be present in vehicle 1. The doors 8, 9 may comprise one or more windows 10, 11. The doors are moveable between a position where they close off a respective aperture in the vehicle body and a position where objects (such as passengers) are free to move through the aperture.

The vehicle 1 may also comprise one or more aerodynamic devices. For instance, as shown in FIG. 1, the vehicle 1 comprises a rear wing 12. The rear wing 12 may be a fixed wing. The rear wing 12 may be moveable between two or more positions. The rear wing 12 may be used to provide downforce when the vehicle 1 is moving in a forward direction.

The vehicle 1 comprises a powertrain 13 that powers one or more wheels 2, 3. The powertrain 13 may comprise an internal combustion engine, an electrical machine or any number of these separately or in combination. The electrical machine may be capable of operating as an electrical motor and/or an electrical generator. For instance, the vehicle 1 may be a hybrid vehicle that can be powered by an internal combustion engine and one or more electrical machines. The powertrain may comprise one or more torque transfer elements that transfer torque from the power sources to the wheel(s) 2, 3. Only some of the wheels may be driven wheels. In the example shown in FIG. 1, the vehicle 1 is a mid-power source vehicle which means the power source is generally located between the axes of the front and rear wheels. This is particularly advantageous in the present invention because it means the nose region 14 of the vehicle does not comprise a large power source unit. The vehicle 1 could have a front- or rear-power source or the power sources could be distributed around the vehicle 1.

As mentioned above, the vehicle 1 comprises a nose region 14. The nose region 14 is located forward of the passenger compartment 4 of the vehicle 1. The nose region 14 is located in front of the windscreen 5 of the vehicle 1. The nose region may comprise front wheels 2. The nose region 14 may comprise headlights 15. The nose region 14 may comprise other lights, such as fog lights. The nose region 14 may comprise one or more outlets for air that travels through the nose region 14. Second 16 and fourth 17 outlets are positioned at the rear of nose region 14. Second and fourth outlets 16, 17 are positioned near windscreen 5. They are spaced apart from each other on either side of the centreline of the vehicle 1. Second and fourth outlets 16, 17 are located in windscreen scuttle 19. Air that flows out of second and fourth outlets 16, 17 may be used for aerodynamic purposes and may not be used to cool components comprised within vehicle 1. Windscreen scuttle 19 is a region of the nose region 14 between the windscreen 5 and the bonnet 20 of vehicle 1. The windscreen scuttle 19 may house components associated with the windscreen, for instance windscreen wipers and/or windscreen washer jets. It may also comprise other vents.

The nose region may also comprise other outlets such as fifth and sixth outlets 21, 22. In the example shown in FIG. 1, fifth and sixth outlets 21, 22 are configured to permit air to flow out of the outlets 21 when the vehicle is in forward motion. The air that flows out of the fifth and sixth outlets 21, 22 may be used to cool components comprised within vehicle 1.

Figure 2:
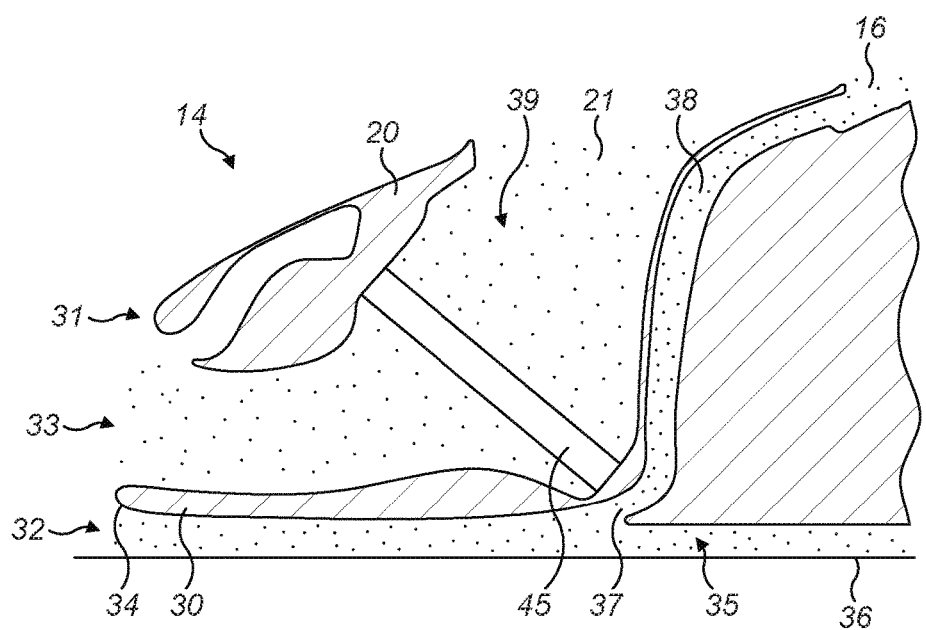
FIG. 2 shows a schematic drawing of a nose region of a vehicle.

FIG. 2 shows a cross sectional view through nose region 14 that cuts through one of outlets 21 or 22 and one of outlets 16 and 17. For example, outlets 16 and 21. It can be seen from FIG. 2 that vehicle 1 comprises a front splitter 30. Front splitter 30 is located at the front of vehicle 1 in nose region 14. Front splitter 30 is configured to divide the flow of air that hits the front 31 of the vehicle 1 when the vehicle 1 is in forward motion so that a portion of the airflow flows underneath 32 vehicle 1 and a portion of the airflow flows into seventh outlet 33. As will be appreciated, there may be vertical elements present in nose region that divide the airflow into separate channels within the region indicated in FIG. 2 by seventh outlet 33. Therefore, there may be more than one outlet present in the front of vehicle 1 above the splitter 30. The front splitter 30 may comprise a flared front portion 34. The front splitter 30 may have a rounded profile on the front portion 34 to aid in guiding the airflow to each side of the front splitter 30. The flared front portion 34 may be in the form of a raised underside surface of the front splitter relative to a flat running surface 36 of the vehicle (i.e. a horizontal plane). This raised underside surface means that larger obstacles can fit under nose region 14 and reach front wheels 2 at which point the nose region will be raised by the obstacle due to front wheels 2 being raised by the obstacle. As described herein, this raised underside profile of the front splitter 30, or, indeed, a raised underside of the front of the vehicle 1 in the nose region 14, may mean that more airflow is channelled underneath the vehicle than is otherwise desirable. The raised front end of the front splitter 30 can cause an increase in air pressure as air moves rearwardly under the front splitter. This can cause a decrease in downforce generated by the vehicle due to the increase in pressure under the vehicle 1 due to a reduction in the effect that the running surface of the vehicle has on the flow of air under the vehicle. Therefore, the present invention looks to remove some of the airflow from under the nose of the vehicle to cause the air in front of the duct to accelerate thus generating a lower pressure region in front of the duct. This reduction in pressure in front of the duct increases the downforce generated by the vehicle.

Vehicle 1 comprises an underside 35. The underside 35 may be in the form of one or more panels and components that together form the underside of the floor of the vehicle 1. The vehicle 1 comprises a first outlet 37 positioned at the underside 35 of the vehicle 1. The vehicle 1 comprises a first duct 38 that is configured to channel air from the first outlet 37 to the second outlet 16 located away from the underside of the vehicle 1. The first duct 38 may be configured to only channel air from the first outlet 37 to the second outlet 16. First duct 38 may be configured to channel substantially all of the air entering the first outlet 37 to the second outlet 16. The first duct 38 may run continuously around its cross-section area along its length.

The first outlet 37 may be positioned laterally to one side of the centreline of the vehicle 1. In the example shown in FIGS. 1 and 2, the second outlet 16 is located near windscreen 5. However, the second outlet could be located on any region of the vehicle body away from the underside of the vehicle 1 that means that air flowing underneath the vehicle 1 flows into first outlet 27 and out of second outlet 16 when the vehicle 1 is in forward motion. For instance, second outlet 16 could be located on the side of the vehicle 1 or on a rear portion of a wheel arch of the vehicle 1.

Figure 3:
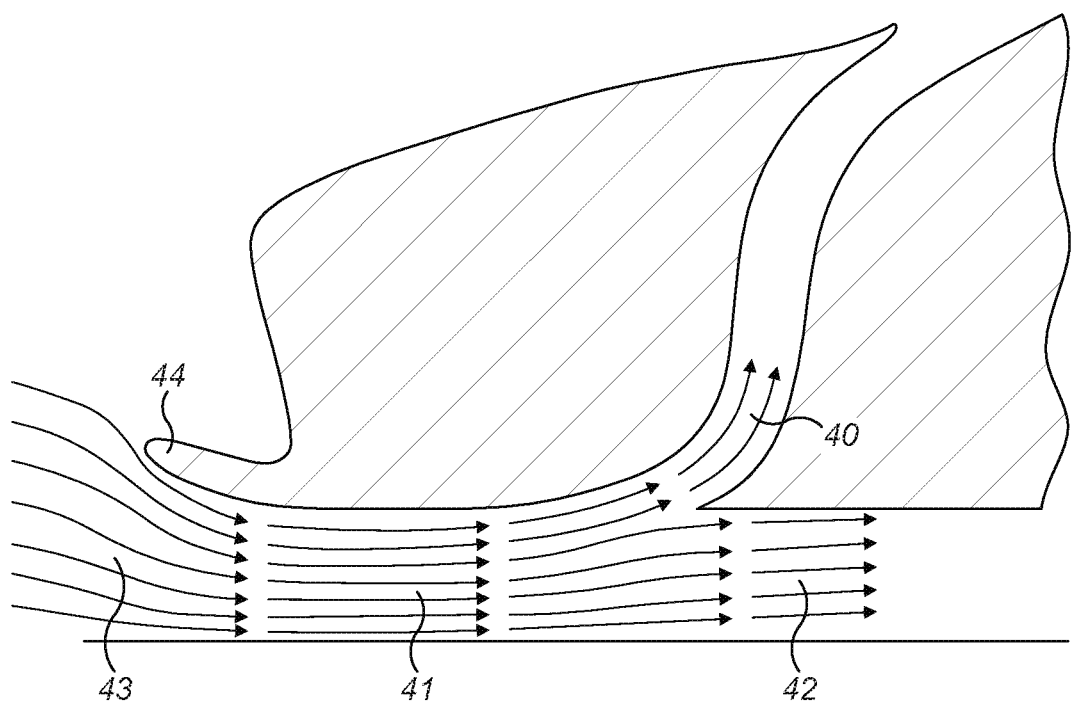
FIG. 3 shows flow lines of an air flow through the nose region of a vehicle.

First outlet 37 may be located in the nose region 14 of vehicle 1. The first outlet 1 may be located in front of where the front wheels contact the running surface of the vehicle 1. As shown in FIG. 2, the first outlet 37 is located behind front splitter 30. The first outlet 37 may be located behind the leading edge 34 of front splitter 30. The first outlet 37 being located in a forward part of the vehicle underside 35 means that a portion of the air flowing underneath the vehicle can be removed from the underside of the vehicle. This is as shown in FIG. 3. FIG. 3 shows the flow lines of air flowing underneath the vehicle when the vehicle is in forward motion. A first portion 40 of the air flowing underneath 41 the vehicle enters the first outlet 37 and thus is redirected from flowing underneath the length of vehicle 1. Thus, a reduced amount of air comprised in the second portion 42 remains to flow underneath the rest of the length of the car.

The removal of the first portion 40 of the air flowing underneath the vehicle means there is less resistance presented to the air flowing under the front splitter 30. This therefore causes the air in front of the first outlet 37 to accelerate which thus causes a reduction in the pressure of this air 41. This thus means that there is a lower pressure on the underside of the vehicle in the region in front of the first outlet, as shown at 41. It can be seen at the air flow 43 that the raised front profile of the nose 44 of the vehicle 1 causes more air to be channelled underneath the vehicle 1.

Due to friction, a boundary layer, which is a layer of air where the local velocities are lower than the vehicle speed, appears on the underside of the vehicle. This layer gradually grows as it moves rearwardly along the underside of the vehicle. This boundary layer enters the duct at the first outlet 37 as it is associated with the underside surface that continues into the duct. A fresh boundary layer is formed behind the first outlet 37 which is the starts growing again from scratch. This provides an additional downforce benefit at the rear of the vehicle because the rear diffuser of the vehicle is presented with a thinner boundary layer.

As shown in FIG. 2, the first outlet 37 may be directed in a forwards direction so that when the vehicle is in forward motion air is channelled into the first air duct. The first outlet 37 may be scoop shaped to encourage air to flow into the first air duct. In this way, the first outlet 37 may have a cross-sectional area that is greater than the cross-sectional area of the portion of the first duct 38 adjacent to the first outlet 37.

As discussed herein, the vehicle may comprise other outlets in the nose region such as fifth and sixth outlets 21, 22. FIG. 2 shows fifth outlet 21 and seventh outlet 33. Vehicle 1 comprises a cooling duct 39 that runs between seventh outlet 33 can fifth outlet 21. The vehicle 1 comprises a heat exchanger 45. The heat exchanger 45 may be configured to permit heat energy to be extracted from a coolant thus cooling the coolant. The heat exchanger 45 may be part of a vehicle thermal management system. The cooling duct 39 is configured to channel air through the heat exchanger 45. This thus provides cooling to the heat exchanger 45. The heat exchanger 45 and cooling duct 39 located in the nose region 14 of vehicle 1. As can be seen in FIG. 2, the first duct 38 that runs between first outlet 37 and second outlet 16 is adjacent to the cooling duct 39. However, the first duct 38 is configured such that there is no direct airflow between first duct 38 and cooling duct 39. First duct 38 and cooling duct 39 are separate ducts that do not share any outlets. The airflow through first duct 38 is used by the vehicle for aerodynamic purposes and not for temperature management purposes. Whereas the airflow through cooling duct 39 is used by the vehicle for temperature management purposes, it may also be used for aerodynamic purposes. The cooling duct 39 may be configured to direct air flow over components that require cooling. These components may be other than a heat exchanger.

As is shown in FIG. 2, the first duct 38 may be positioned between the cooling duct 39 and the passenger compartment 4. The first duct may be positioned adjacent to the cooling duct 39. This configuration is especially advantageous in a vehicle with a middle or rear located powertrain. This is because the nose region of the vehicle 1 is generally used for ducting air to components that need cooling. The first duct 38 can fit in a small volume in this region as it only needs to duct air from one region to another to effect the air pressure under the vehicle without needing to also cool vehicle components.

Figure 4:
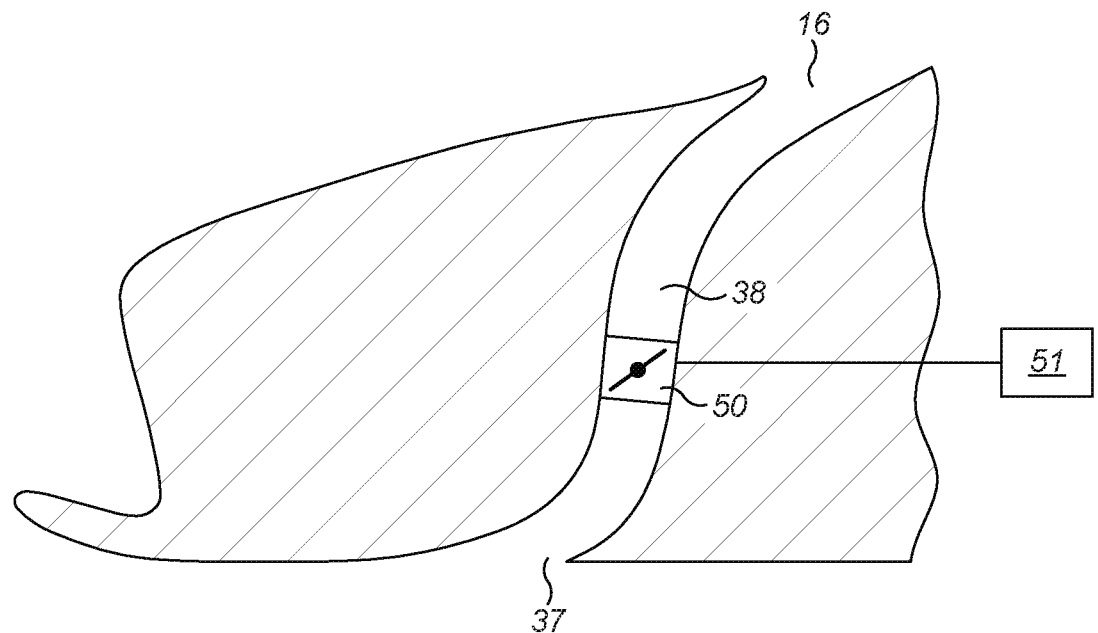
FIG. 4 shows a schematic drawing of a nose region of a vehicle where a duct comprises a variable restriction.

FIG. 4 shows a first duct 38 that comprises a variable restriction 50. The variable restriction 50 may be located along first duct 38. Alternatively, variable restriction 50 may be located at one of the outlets, first outlet or second outlet. For instance, variable restriction 50 may be in the form of a flap that blocks air from flowing into first outlet 37 or out of second outlet 16. Variable restriction 50 may be in the form of a valve, such as a rotatable paddle that can variably reduce the airflow through first duct 38. Variable restriction 50 may be controlled by a vehicle management unit 51. The vehicle management unit 51 may control the opening of the variable restriction in response to inputs provided to the vehicle management unit by sensors and/or from other data collected by the vehicle management unit. For instance, the vehicle management unit 51 may control the opening of the variable restriction based on the speed of the vehicle, whether the vehicle is under going acceleration or braking, and/or the dynamic condition of the vehicle.

The variable restriction 50 may be movable from a first position in which airflow through the first duct 38 is substantially unimpeded to a second position in which airflow through the duct is substantially impeded.

The vehicle 1 may comprise more than one duct and associated openings as described in relation to first duct 38. The vehicle may comprise a second duct that is configured to channel air from a third outlet at the underside of the vehicle (as per first outlet 37 described herein) to a fourth outlet 17 (as per second outlet 16 described herein) as shown in FIG. 1. Thus, this second duct may be configured to cause a lower pressure behind the third outlet on the underside of the vehicle than the underside of the vehicle in front of the third outlet. The first and second ducts may be positioned laterally to either side of the centreline of the vehicle. The first and third outlets may be positioned laterally to either side of the centreline of the vehicle. The first and third outlets may be positioned at the same distance from the centreline of the vehicle. The second and fourth outlets may be positioned laterally to either side of the centreline of the vehicle. The second and fourth outlets may be positioned at the same distance from the centreline of the vehicle.

It will be understood that front and rear as described herein is defined relative to the primary (i.e. forward) motion direction of the vehicle. This primary motion direction may be when the vehicle is travelling in a straight line along the primary motion direction.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle having an underside and being supported on a running surface, the vehicle comprising
    a first duct configured to channel air from a first inlet located at the underside of the vehicle to a first outlet away from the underside of the vehicle, the first inlet being acutely angled relative to the underside of the vehicle, the vehicle being a ground effect vehicle configured so that the underside of the vehicle is in sufficient proximity to the running surface so that when the vehicle is in forward motion the underside of the vehicle in front of the first inlet is at a lower pressure than the underside of the vehicle behind the first inlet and a flow of air entering the region between the underside of the vehicle and the running surface is accelerated in the region between the underside of the vehicle and the running surface to generate downforce on the vehicle.

2. The vehicle according to claim 1, the vehicle comprising a passenger compartment and a nose region forward of the passenger compartment, wherein the first inlet is located at the underside of the vehicle in the nose region.

3. The vehicle according to claim 1, the vehicle comprising a front splitter, wherein the first inlet is located behind the front splitter.

4. The vehicle according to claim 3, wherein the front splitter comprises a raised front end.

5. The vehicle according to claim 4, when the vehicle is in forward motion, the raised front end of the front splitter causes an increase in air pressure as air moves rearwardly under the front splitter.

6. The vehicle according to claim 1, the vehicle comprising a passenger compartment and a nose region forward of the passenger compartment, wherein the first outlet is located in the nose region.

7. The vehicle according to claim 1, the vehicle comprising a windscreen, wherein the first outlet is located in a portion of the nose region where the windscreen meets the nose region.

8. The vehicle according to claim 1, the vehicle comprising a windscreen scuttle where the windscreen meets the nose region, wherein the first outlet is located in the windscreen scuttle.

9. The vehicle according to claim 7, wherein the first outlet is located at an outer side of where the windscreen meets the nose region.

10. The vehicle according to claim 1, wherein the first inlet is directed in a forward direction so that when the vehicle is in forward motion air is channelled into the first duct by the first inlet from underneath the vehicle.

11. The vehicle according to claim 1, wherein the first inlet has a cross-sectional area that is greater than the cross-sectional area of the portion of the first duct adjacent to the first inlet.

12. The vehicle according to claim 1, the vehicle comprising a passenger compartment and a nose region forward of the passenger compartment, wherein the first duct is located in the nose region.

13. The vehicle according to claim 12, the vehicle comprising a heat exchanger and a cooling duct configured to channel air through the heat exchanger, the heat exchanger and cooling duct being located in the nose region.

14. The vehicle according to claim 13, wherein the first duct is adjacent to the cooling duct.

15. The vehicle according to claim 13, wherein the first duct is positioned between the cooling duct and the passenger compartment.

16. The vehicle according to claim 1, the first duct comprising a restriction movable from a first position in which airflow through the first duct is substantially unimpeded to a second position in which airflow through the first duct is substantially impeded.

17. The vehicle according to claim 1, the vehicle comprising a second duct configured to channel air from a second inlet at the underside of the vehicle to a second outlet away from the underside of the vehicle so that when the vehicle is in forward motion the underside of the vehicle in front of the second inlet is at a lower pressure than the underside of the vehicle behind the second inlet.

18. The vehicle according to claim 17, wherein the first and second ducts are positioned either side of a centreline of the vehicle.

19. The vehicle according to claim 17, wherein the first inlet and first outlet are positioned to one side of the centreline of the vehicle, and the second inlet and second outlet are positioned to the other side of the centreline of the vehicle.

20. A vehicle having an underside, the vehicle comprising:
- a passenger compartment and a nose region forward of the passenger compartment;
- a heat exchanger located in the nose region;
- a cooling duct located in the nose region configured to channel air through the heat exchanger; and
- a first duct located in the nose region, adjacent to the cooling duct, wherein the cooling duct and first duct are separate ducts that do not share any inlets or outlets and wherein the first duct is configured to channel air from a first inlet located at the underside of the vehicle to a first outlet away from the underside of the vehicle, the first inlet being acutely angled relative to the underside of the vehicle, so that when the vehicle is in forward motion the underside of the vehicle in front of the first inlet is at a lower pressure than the underside of the vehicle behind the first inlet.

* * * * *